United States Patent
Kompanets et al.

(10) Patent No.: US 9,709,877 B2
(45) Date of Patent: Jul. 18, 2017

(54) VIDEO PROJECTOR EMPLOYING FERROELECTRIC LIQUID CRYSTAL DISPLAY

(71) Applicants: Igor Nikolaevich Kompanets, Moscow (RU); Aleksandr Lvovich Andreev, Moscow (RU)

(72) Inventors: Igor Nikolaevich Kompanets, Moscow (RU); Aleksandr Lvovich Andreev, Moscow (RU)

(73) Assignee: Igor Nikolaevich Kompanets, Moscow (RU)

( * ) Notice: Subject to any disclaimer, the term of this patent is extended or adjusted under 35 U.S.C. 154(b) by 53 days.

(21) Appl. No.: 14/404,429

(22) PCT Filed: May 29, 2013

(86) PCT No.: PCT/RU2013/000439
§ 371 (c)(1),
(2) Date: Nov. 26, 2014

(87) PCT Pub. No.: WO2013/180601
PCT Pub. Date: Dec. 5, 2013

(65) Prior Publication Data
US 2015/0109537 A1 Apr. 23, 2015

(30) Foreign Application Priority Data
May 30, 2012 (RU) .................... 2012122120

(51) Int. Cl.
*G03B 21/00* (2006.01)
*G02F 1/141* (2006.01)
(Continued)

(52) U.S. Cl.
CPC .......... *G03B 21/006* (2013.01); *G02B 27/48* (2013.01); *G02F 1/141* (2013.01); *G03B 21/208* (2013.01);
(Continued)

(58) Field of Classification Search
CPC ....... G02B 27/48; G02F 1/141; G02F 1/1416; G02F 2001/1414; G03B 21/00; H04N 9/3129; H04N 9/3141
See application file for complete search history.

(56) References Cited

U.S. PATENT DOCUMENTS

| 6,031,588 | A * | 2/2000 | Dultz | A61F 9/023 345/7 |
| 2010/0177172 | A1 | 7/2010 | Ko | |
| 2015/0304646 | A1 * | 10/2015 | Kompanets | G02B 27/2292 348/58 |

OTHER PUBLICATIONS

Chris Chinnock. Wanted: 3D 4K HFR WCG LIP, Apr. 18, 2012 (http://displaydaily.com/2012/04/18/wanted-3d-4k-hfr-wcg-lip/).
(Continued)

*Primary Examiner* — Sultan Chowdhury
*Assistant Examiner* — Magda Cruz
(74) *Attorney, Agent, or Firm* — Paul & Paul

(57) ABSTRACT

The invention relates to the field of optoelectronics, and may be used in devices and of visualization, displaying, storage and processing of information, in particular in projection displays, etc. Video projector consists of a liquid crystal micro display based on structure FLCoS, and an optical unit of reading the information formed in the structure FLCoS, containing a light source and projection optics, optically coupled to the structure FLCoS, and a screen, onto which the information is projected. As the electro-optical material the low-voltage ferroelectric liquid crystal (FLC) with compensated helix providing physically realizable, continuous, half-tone, hysteresis-free modulation characteristic is used in the
(Continued)

structure FLCoS. Lasers of red, green and blue radiation serve as the sources of light in three different color channels RGB. To destroy the ability of their radiation to the interference, a cell with FLC is inserted into the optical unit of information reading that implements fast electrically controlled spatial phase light modulation with a depth of $\geq \pi$, and in order to form on the screen the information blocks with a capacity of $10^8 \ldots 10^9$ pixels, with different geometric configurations a two-dimensional scanner is input, which optically coupled to the optical unit of information reading and to the screen. The technical result is an increase of frame rate, expanding the color gamut, brightness enhancement, noise reduction.

5 Claims, 7 Drawing Sheets

(51) Int. Cl.
    *H04N 9/31*     (2006.01)
    *G02B 27/48*     (2006.01)
    *G03B 21/20*     (2006.01)

(52) U.S. Cl.
    CPC ....... *G03B 21/2033* (2013.01); *H04N 9/3129* (2013.01); *H04N 9/3141* (2013.01); *G02F 1/1416* (2013.01); *G02F 2001/1414* (2013.01)

(56) References Cited

OTHER PUBLICATIONS

Alexander Samarin. LCoS—microdisplays and their application. Components and technologies, No. 8, 24-32 (2008).

Denis Darmon, John R. McNeil, and Mark A. Handschy. LED-Illuminated Pico Projector Architectures. SID-08 Symposium Digest, v. 39, Issue 1, 1070-1073 (2008).

Fedosenkova T.B., Andreev A.L., Pozhidaev E.P., Kompanets I.N. Electrically controlled the birefringence in helix-free ferroelectric liquid crystals. Bulletin of the Lebedev Physical Institute, No. 3, 45-52 (2002).

Andreev A.L., Kompanets I.N., Minchenko M.V., Pozhidaev E.P., Andreeva T.B. Speckle noise suppression using the liquid crystal cell. Quantum Electronics, vol. 38, No. 12, 1166-1170 (2008).

* cited by examiner

VIDEO PROJECTOR EMPLOYING FERROELECTRIC LIQUID CRYSTAL DISPLAY

CROSS-REFERENCE TO RELATED APPLICATION

This application is a 371 national stage application of International Application PCT/RU2013/000439, filed May 29, 2013, and claims the priority of Russian Application No. 2012122120, filed on May 30, 2012.

FIELD OF TECHNOLOGY

The invention relates to the field of optoelectronics, and may be used in devices and systems of visualization, displaying, storage and processing the information with high information capacity, particularly in two-dimensional and three-dimensional projection displays, in devices and systems of optical advertisements and show-business, etc.

BACKGROUND OF THE INVENTION

Displays as devices of information displaying are one of the key elements of information and communication systems, including television systems. The increase of bandwidth, or informational capacity of such systems is an actual task. Its solution is provided both by increasing the number of parallel channels (relative to displays—the number of elements or pixels in the display screen), and by increasing speed of information transmission (relative to the display—increasing the display frame rate).

Taking into account the relationship of both factors in the systems with a given bandwidth, one can vary every of them at the expense of another. Relative to displays, however, the frame rate should always be above a certain critical frequency, at which the screen shows flicker-free images. For many applications, such as in cinema and television, the critical frame rate of 24-50 Hz is allowed, while according to medical recommendations, and taking into account the observation of fast moving objects (like a flying ball) on a display screen the frequency of 90-100 frames per second is more preferable (for Russia the value 100 fr./sec is better agreed with the frequency of the electric net). It is better to retain this value and for displays with sequential change of colors (in time), promising the triple reduction of the number of display elements and observing whole (non-structured) and more bright image due to the elimination of the triad of color filters. In such a case, the refresh rate on the display screen should be of 270-300 Hz, and using the technology of three-dimensional stereovision—even twice more.

Really the most widespread display technologies currently provide a much lower frame rate that is explained by slow processes of active or passive light modulation respectively in emitting or electro-optical material of a display screen. For example, in cathode-ray television displays the frame rate can be up to 300 Hz, in displays based on organic light-emitting materials—potentially up to several hundred Hz, but actually (because of the high currents) is electronically limited to 200 Hz, in plasma displays the frame rate also does not exceed 200 Hz, and in the most widespread displays based on nematic liquid crystals (NLC), the maximum frame rate is only 120-160 Hz.

Concerning to the number of pixels (spatial resolution), in advanced video projectors and television displays the preferred format is the so-called "High-Definition>> (HD)—1920×1080 pixels. In personal computers the format 1024×768 (XGA) prevails till now, and screens of smart devices (primarily the screens of mobile phones) still remain 800×600 pixels (SVGA) and even a 640×480 (VGA). However, due to the constant need in increasing the throughput of information and communication systems, especially in conditions of the limited speed of displays, the general trend is the steady increase of their spatial resolution. Not only the formats XGA (about 1000×1000 or 1K×1K pixels) and HD (of the order 2000×1000 or 2K×1K pixels) are master, but also (2K×2K) and even (4K×2K) pixels [1].

Increasing the number of pixels, however, leads to serious technological problems and difficulties in addressing the display elements. Though modern methods of data processing and pixel addressing allow to address parallelly several parts of the frame and selective addressing only changed pixels in a frame, nevertheless the task of increasing the number of pixels on the screen is associated with great difficulties. Solving the problem by using the high-resolution common composite screen composed of a few display screens, i.e. due to spatially and frequency agreed screens makes a composed display cumbersome, difficulty controlled and expensive, and therefore not effective.

Thus, the throughput of information displaying on a screen of contemporary display is restricted both in the speed, and spatial resolution.

High resolution is especially needed in displays destinated for projecting the information onto a large screen (including TV screen). Information is projected onto a screen via an optical assembly comprising a light source and projection optics. The video projectors based on a micro display with a micro mirror or liquid crystal matrix addressed by drivers, made on silicon integrated technology are most widespread [2].

In all types of video projectors a white light source is often used, such as a compact high-pressure lamp, and the colors are selected by using filters or polarization prisms. In recent years, LEDs with RGB or white light, and even more advanced laser diodes [4] begun to be used for reading the images, but a very significant problem arises: to create two important components for laser video projectors—the effective laser diodes of green radiation and the compact non-mechanical type despecklers to suppress interference noise.

In known video projector DLP (from Digital Light Processing) of Texas Instruments Inc. [2], in the matrix of micro mirrors, each mirror of size 15×15 micrometers is fixed on two hinges, and it can be quickly (electromechanically, for about ten microseconds) deflected at angles +10 or −10 degrees under the pulses of an electric voltage generated by means of silicon integrated circuits. As a result, the light reflected from the mirror passes or does not pass through the diaphragm, so the intensity of the output optical signal has only two values: 1 or 0. Halftones (gray levels) needed to produce color images are formed in such a "digital" micro display electronically—by varying the frequency of deflection of each individual mirror. This reduces the speed of the micro display and frame rate of the video projector. However, taking into account both parameters—rapidity and spatial resolution, such DLP projector has a very high informativeness: the frame rate of the 768×768 matrix of micro mirrors with a capacity of 3 color bits in the three-chip high-speed video projector (with three micro displays and reading the information by different RGB light sources) reaches 4750 Hz, while for 8 and 15 color bits—1780 and 950 Hz, respectively. Due to the high speed of such a micro display operation the color images can be formed even by one micro display instead of three, if to input different color components (RGB) for reading alternately.

The matrix of micro mirrors is able to reflect the light intensity effectively that allows the use DLP video projector for image displaying on a large collective screen, including the cinema screen. However, the projector has a limited term (about 3 years) of continuous reliable operation because of the mechanical principle of micro mirror deflection; besides, its disadvantage is the high value of the control voltage −30 V that requires the specialized integrated circuits for this micro display control.

Projection displays are known [2, 3], in which in every of three different (RGB) color channels of the video projector a micro display with NLC operates, which is made using LCoS (Liquid Crystal on Silicon) technology. For example, helmet-mounted video projectors are widespread, and in recent years—compact pico projectors, used individually or combined with other smart devices and mobile phones, and able to display on a screen with a size of about 1 sq. meter the images of VGA and SVGA formats with the brightness of 15-20 lumens. Limitation of screen size and image format is due to low brightness of used light sources. Because of the use of nematic liquid crystals the speed of these devices is also limited. Although some types of microdisplays based on NLC are intended for a specific type of high resolution video projectors and have a format 4K, in general, due to the low speed of NLC the micro displays and based on them video projectors are not highly informative.

The closest to the proposed invention (a prototype) is a video projector [4] for a projection display comprising a LC micro display based on the structure FLCoS (Ferroelectric Liquid Crystal on Silicon) and an optical unit of reading the information formed in the structure. This unit consists of a light source and projection optics, optically coupled to the structure FLCoS and the screen onto which the information is projected. As a material in the FLCoS-structure the helix ferroelectric LC of smectic type is used (FLC), and the light sources in three different RGB color channels are LEDs of red, green and blue radiation.

Unlike to NLC, where electro-optical response time does not depend on the sign of the electric field (due to the quadratic dependence on the field), and the initial state of NLC layer slowly (for milliseconds in the best case) returns after electric voltage switching off under the force caused by the elastic deformation of NLC layer, in FLC the electro-optical effect is linear on the electric field, i.e. FLC responds to the sign of applied voltage. As the result the electro-optical response time at switching on and switching off, when bipolar control voltage pulses are applied, is the same and is given by [5]:

$$\tau \sim \gamma_\phi/(P_s \cdot E), \quad (1)$$

where $\gamma_\phi$—FLC rotational viscosity, $P_s$—value of the vector of spontaneous polarization, E—electric field tension. In practice response times ON and OFF, depending on the amplitude of control bipolar pulses (from a few to tens of volts) are from hundreds to tens of microseconds, i.e. shorter on the order—two orders than in NLC. Because of this the first letter F in the abbreviation FLCoS is often translated as "fast".

In the described prototype [4] the electro-optical effect by Clark-Lagerwall is used in FLC in the structure FLCoS of a micro display. This effect is implemented in thin (1-2 micrometers) FLC layers and is characterized by bistable modulation characteristic due to the strong interaction of a layer with boundary surfaces [6]. Therefore bistable FLC-display cells of this type are also called "surface-stabilized structures", and micro displays based on them—"digital" (they have two optical states, like in micro mirror DLP). The frequency of light modulation in such structures can be up to several kHz at the control electric voltage of ±2, 5 . . . 10 V.

To generate a halftone (gray scale) and hence colors in the company Displaytech like in DLP a decision was suggested to modulate the light with different frequency [2-4]. Through this approach, Displaytech created a whole range of addressable (by means of a silicon control matrix) color "digital" micro displays with a large number of elements (over one million) and small aperture (diagonal is less than an inch), competing with based on NLC micro displays and exceeding their speed of image refreshing (240 frames/sec). This speed already allows to provide sequential (alternative) formation of color instead of the spatial one (using the triad filters) and more comfortable observation of 3D information.

However described known video projector does not solve the problem of a substantial increasing the frame rate and spatial resolution, i.e. improving its informative content to a value at least equal, if not greater, than in DLP video projector.

Thus, the known video projector for the projection display comprising LC micro display on the base of the structure FLCoS with FLC and an optical unit of reading the information formed in FLCoS-structure, consisting of RGB LED light source (with LEDs of red, green and blue radiation) and the projection optics, optically coupled with FLCoS-structure and a screen on which the information is projected, provides a sufficiently high (up to 240 Hz) frame rate and spatial resolution of $10^6$ . . . $10^7$ pixels, however, frame rate of the video projector is limited because of the impossibility to implement physically continuous modulation characteristics with high modulation frequency in a micro display based on FLCoS-structure with used bistable FLC;

for the same reason to have the grayscale modulation characteristics the complicated pulse frequency addressing of micro display elements is used that reduces the frequency of refreshing images (frames) proportionally to the increasing the number of gray scale levels (in bits);

as a result of these limitations, the sequential color change (in time) and changing the frame for the left and right eyes during the formation of color stereoscopic image simultaneously are feasible only at low frequency (about 40 Hz in the best case) of frames observed by each eye, and therefore, their perception is uncomfortable, taking into account that the frequency of comfortable perception (without flicker and image blur) is 90-100 Hz;

amount of hues of colors (color gamut) determined by the spectral purity of RGB components of readout radiation is limited by using LEDs, the spectral width of which is several tens of nanometers, i.e. more than 10 times exceeds the spectral width of laser diodes;

brightness of the readout light beam is limited by the power density of LEDs radiation to some small solid angle, and it is 10 times less than the power density to the same solid angle which is inherent for the laser diode.

The tasks solved in the proposed video projector are:

increasing the frame rate almost twice—up to 540-600 Hz, and comfortable perception of 3D stereoscopic images at sequential color change in time in a single micro display with the structure FLCoS due to the use in this structure of the new high-speed helix-free FLC with a halftone modulation characteristic;

expanding the color gamut and increasing the image brightness due to readout the information formed in the micro display with FLCoS-structure by means of using RGB laser beams alternately illuminating micro display in each frame;

destruction of the ability of the laser beam reading out the information to the interference, and thereby suppressing the interference speckle-noise in images formed by this beam, due to input to the video projector the electrically controlled device—a despeckler that is the one-channel phase-modulating FLC-cell;

providing on a screen real time displaying the information blocks (images) with the capacity of $10^8 \ldots 10^9$ pixels and with different geometric configuration by means of input into an optical channel of the video projector a two-dimensional scanner, such as electromechanical (galvanometer) mirror scanner, implementing a spatial scan of the output beam.

The invention is illustrated by the following description with reference to the drawings.

SUMMARY OF THE INVENTION

Solution of the task is provided by the fact that in the known device of a video projector comprising a liquid crystal micro-display based on the structure FLCoS with FLC and an optical unit of readout the information formed in the structure, comprising a light source and projection optics, optically coupled to the structure FLCoS and a screen, onto which this information is projected, new is that as an electro-optical material for using in the structure FLCoS the low-voltage FLC with a compensated helix is selected that has the helix wave vector $q_0=2\pi/p_0$ tending to zero, and in FLC the value of rotational viscosity is in the range $0.3<\gamma_\varphi<1.0$ Poise, the spontaneous polarization Ps less than 50 nC/cm$^2$, and the modulus of elasticity K, which determines the deformation along smectic layers, is in the range $(1-3)\cdot 10^{-12}$ Newton; as light source in three different RGB color channels the laser diodes of red, green and blue light are used, and to destroy the ability of their radiation to the interference a FLC cell is input, which implements fast electrically controlled spatial modulation of light phase with the depth $\geq \pi$, and to form on a screen the information blocks with a capacity of $10^8 \ldots 10^9$ pixels and with different geometric configuration the two-dimensional scanner is input, which is optically coupled to an optical unit of information readout and with a screen onto which this information is projected.

Figure 1:
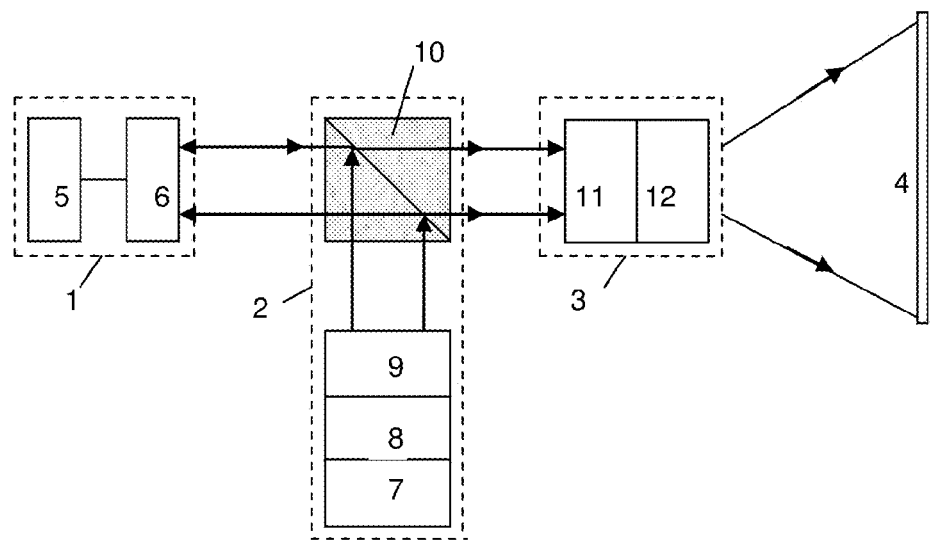
FIG. 1—block diagram of a video projector.

A block diagram of a video projector is shown in FIG. 1. It base is a micro display 1 and the optical system comprising an unit 2 of readout the information formed in a micro display and an unit 3 of projection. A micro display 1 consists of two main parts: a processor 5 and FLCoS-structure 6. An unit 2 of information readout includes a light source 7, collimator 8, despeckler 9 and optical separator device 10 (for example, a prism). Projection unit 3 includes a projection optics 11 and image scanning device 12. Both units 2 and 3 are optically coupled to FLCoS-structure 6 and a screen 4, onto which the information displayed by the structure is projected.

Video projector operates as follows. In a micro display the information to be displayed and control signals from the processor 5 come to FLCOS-structure 6 which forms the information block in the form of a matrix of FLC display cells (pixels) with given optical state in each cell. The radiation from a light source unit 7 after passing through a collimator 8, despeckler 9 and combining device 10 illuminates FLCoS-structure 6, passes through FLC layer, is reflected from the cell electrodes and transformed by polarizers (not shown) into intensity spatial distribution, which via projection optics 11 and scanning device 12 is displayed on a screen 4.

Figure 2:
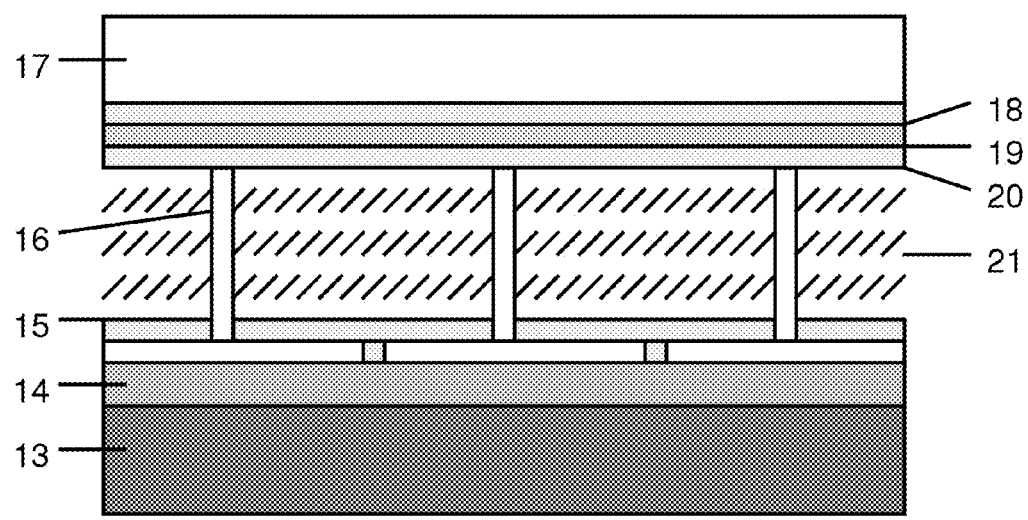
FIG. 2—Scheme of the structure FLCoS.

Schematic diagram of the FLCoS-structure is well known and includes (FIG. 2): a silicon wafer 13 with placed integral elements of a control and addressing 14 and with contact pads 15 of display cells (pixels), a dielectric (glass) plate 17 with a transparent common electrode 18, protective dielectric film 19 and orienting film 20, a layer 21 of FLC, which thickness is defined by spacers 16.

The main distinguish of FLCoS-structure in the claimed video projector from FLCoS-structure in the prototype is that FLC in it is selected helix-free, i.e. with the wave vector of a helix $q_0=2\pi/p_0$, tending to zero, and in FLC the values of rotational viscosity, spontaneous polarization and modulus of elasticity, which determines the deformation along smectic layers are in a specific ratio and provide the continuous gray scale and specific dependence of the birefringence of a display cell on the frequency of an electric field. The value of rotational viscosity is in the range $0.3<\gamma_\varphi<1.0$ Poise, the spontaneous polarization Ps is less than 50 nC/cm$^2$, and the modulus of elasticity K, which determines the deformation along smectic layers, is in the range $(1-3)\cdot 10^{-12}$ Newton A satisfaction to the above ratio provides in a layer of helix-free FLC the compensation of a space charge generated by spontaneous polarization in the absence of an electric field due to forming in FLC the periodic deformations of smectic layers, which are the physical cause of changing the refractive index, in contrast to helix FLC, where the change in the birefringence is due to deformation (without changing a pitch) of the helix in an electric field.

Figure 3:
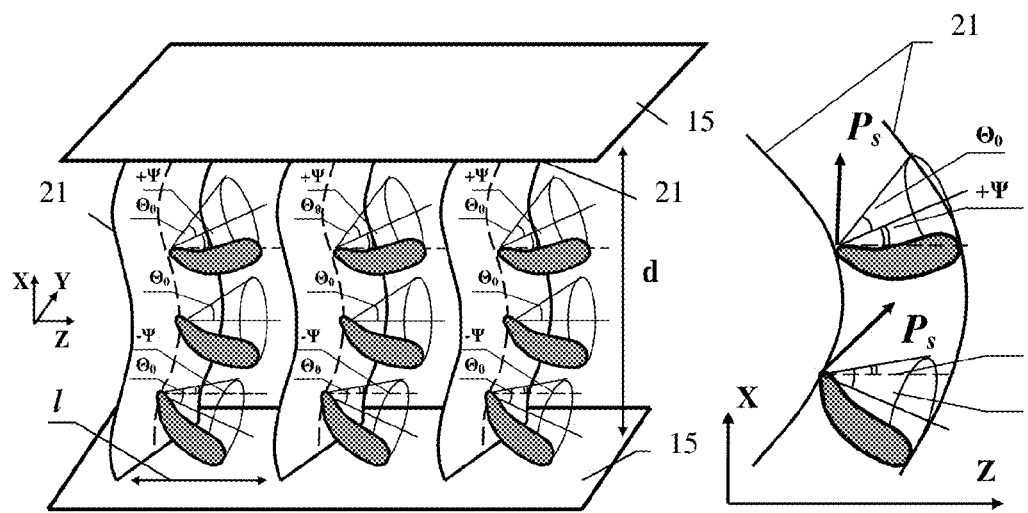
FIG. 3—The deformation of smectic layers in helix-free FLC with a planar orientation of the director: a general pattern (a) and a fragment (b). $\Theta_0$—the tilt angle of molecules in smectic layers, $\Psi$—the tilt angle of a smectic layer, $P_s$—the spontaneous polarization vector, d—thickness of an electro-optical cell, 1—thickness of a smectic layer.

FIG. 3 illustrates the presence of spatial periodic deformations in helix-free FLC 21. Molecules in smectic layers, initially inclined at an angle $\Theta_0$ relatively the normal to a layer at this point, are additionally deflected by an angle $\Psi$ with respect to axis z. Consequently, a projection of the director onto the plane xy is changed. The alternating electric field E applied along the coordinate x interacts with the spontaneous polarization and changes a distribution of the angle Ψ, describing the deformation of smectic layers 21.

The development of this process results in the appearance of a soliton, which is a wave packet with a periodic wave localized in it (in fact, a train of solitons). The velocity of a center of the soliton is defined as [7]:

$$V = \frac{\Theta_0}{\gamma_\psi}\left(2K(P_S E\cos\varphi_0 + M) - \left(\frac{2K}{d\Theta_0}\right)^2\right)^{1/2}, \quad (1)$$

where $k_\psi$—modulus of elasticity describing the director deformation on the corner Ψ, $\gamma_\psi$—shear viscosity FLC, M—energy of bending the smectic layers, $\phi_0$—initial azimuth angle of the director orientation.

Physically, this means a change of the type of energy dissipation and the transition of characterizing it coefficients from $\gamma_\phi$ to $\gamma_\psi$. If the value $\gamma_\phi$ is below 0.3 Poise, then with increasing the modulation frequency the transition to $\gamma_\psi$ does not occur, and the soliton mechanism of FLC director orientation is not realized. At $\gamma_\phi \geq 1.0$ Poise the optical response time increases significantly not only at small, but also at high frequencies, where the shear viscosity becomes responsible for the energy dissipation. Increasing the value of spontaneous polarization above 50 nC/cm$^2$ increases the saturation voltage and, hence, the operating voltage of FLC cell. Furthermore, ferroelectric domains are formed that compensate the space charge generated by spontaneous polarization, and as a result, light scattering increases. At last, the value of the modulus of elasticity $(1-3)\cdot 10^{-12}$ Newton determines the interval in which smectic layers are stable and susceptible at the same time to the periodic spatial deformations in the absence of an electric field.

In addition to FLCoS-structure, the distinguish of claimed video projector from a prototype is that for readout the information formed in FLCoS-structure it is proposed to use as light sources 7 the semiconductor laser diodes with red, green and blue radiation instead of RGB LED emitters Like in light-emitting diodes, it is possible in laser diodes easily to modulate with the high frequency a current and power of radiation. Compared with LEDs, laser diodes provide almost an order of magnitude greater a power density that allows increasing the brightness of images on a screen and/or the screen size. It is supposed the sequential (alternate) switching of different colors allowing to reduce three times the number of pixels and to obtain more qualitive images (more bright and whole, without triad filters). Due to the high monochromaticity of laser radiation a display with laser readout posesses expanded color gamut, not achieved for LEDs.

After combining the rays with RGB emission wavelengths in unit 7 the laser beam is collimated in unit 8 and passes through despeckler 9, suppressing the ability of laser rays to interfere with the formation in a projected image the spotted (speckle) structure called speckle noise. In principle, the relative positioning the units 8 and 9 may be reverse. A despeckler 9 can also be between the combining device 10 and projection unit 3. Both positions may be used depending on the power of a laser beam and the degree of its collimation.

The main feature of a despeckler used in the claimed video projector, is that a despeckler is a simple and compact single-pixel cell with helix FLC. When the laser beam passes through a cell the light phase is modulated on electrically induced random, small scale (less than helix half-pitch) inhomogeneities of the refractive index in a volume of FLC layer. As a result, the phase of light is modulated spatially and nonuniformly with a depth of π and more that results in to the destruction of the spatial and temporal coherence of laser rays and its ability to interfere, and hence to substantial reduction (actually to suppressing) the speckle-noise in projected images [8]. A similar effect is achieved when helix-free FLC is used as a phase-modulating medium. It is important that a despeckler based on FLC has a simple design, easy electrical control (meander of 15-30 V amplitude and the frequency from a few hundred to a few thousand Hz), the absence of mechanical elements, and these advantages will become evident when FLC-despeckler is compared with used for this aim spatial light modulators, in particular rotating phase diffuser, or multi-channel matrix forming the orthogonal functions, or vibrating medium.

In unit of projecting 3 the projection optics 11 and device 12 of image scanning, optically coupled to FLCoS-structure 6 and a screen 4 (FIG. 1) are implemented so that they allow to mount on the video projector output an electromechanical (galvanometric) oscillating or rotating mirror scanner. Due to this the two-dimensional spatial scan of the output beam carrying the images formed in a micro display is possible, and thus expanding the capacity of information blocks on a screen up to $10^8 \ldots 10^9$ pixels, and with a possibility of varying their geometric configuration.

Figure 4:
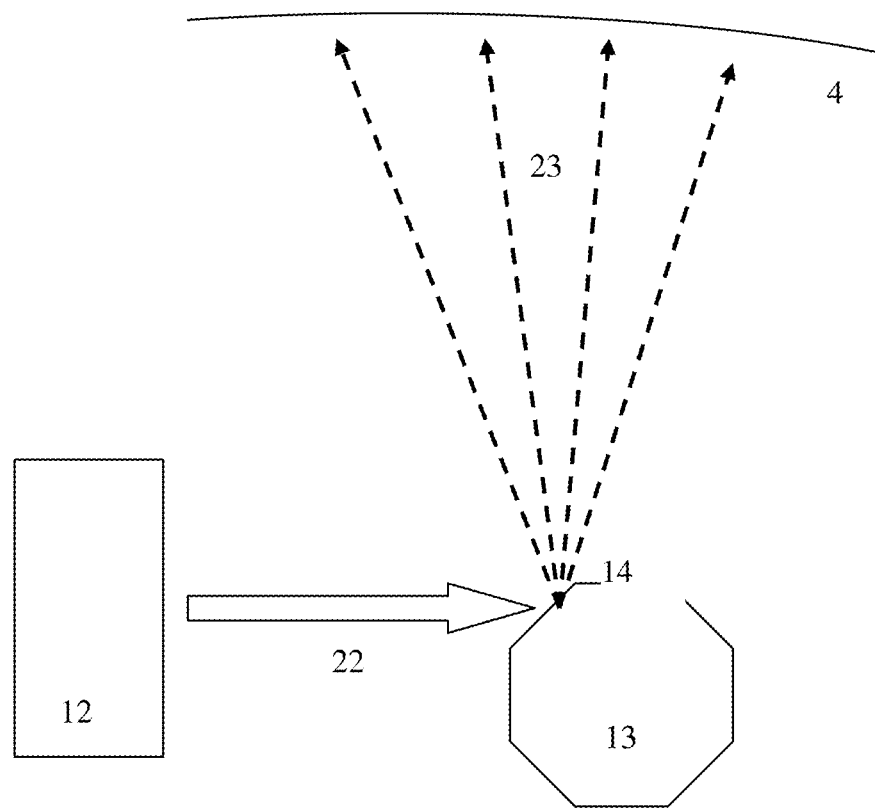
FIG. 4—Scheme of scanning images on the screen.

In the simplest variant of the embodiment, as a top view in FIG. 4 shows, a scan of beams 22 leaving an optical unit 11 is implemented only in the horizontal plane (rays 23). The scanning device is designed as a rotating prism 14 with mirrored faces (or a rotating mirror). In this case it is advisable to use a concave screen (as in large cinema auditoriums). To extend the scan range in the horizontal plane one can use even a circular screen to send laser beams from the bottom to the mirror prism of pyramid shape. Obviously, the prism rotational speed must be synchronized with the frame rate of FLCoS-structure taking into account the possibility of image distribution over all area of a screen 4. In principle, a scan of beams (images) can be two-dimensional if to deviate the rotational axis of the prism or to use two rotating prisms.

When the imaging time of a micro display 1 with format 1K×1K is 1/600 second for example, and a standard one frame period of flicker-free image observation is 1/60 second, 10 fragments of the frame may be sequentially displayed on a screen 4. This is equivalent to 10-fold increase of the initial format (spatial resolution) of a micro display or to using the large (seamless!) screen composed of 10 screens with displaying in each of them an image of the initial format. If a micro display 1 forms an image of 1K×2K pixels, then at the same time on a screen the information block of 10K×2K pixels will be displayed that is equivalent to the large seamless screen, composed of 20 screens of initial format located in 2 rows of 10 screens. Accordingly, when the micro display format increases to 1K×4K, an amount of individual initial screens in the composed screen will increase to 40 (4 rows of 10 screens), and a screen will display the information with spatial resolution of 40K pixels. Further increasing the size of a screen can be reached increasing additionally the frame rate of micro display imaging, and it can be so high as a few kHz.

Thus, the Essence of the Invention is:
1) the creation of such conditions in FLC layer of FLCoS-structure in a micro display of the video projector, under which the compensation of a space charge occurs by means of arising the deformations—periodic changes in the position of the FLC director (refractive index ellipsoid) along each smectic layer, and FLC for this must necessarily be helix-free, i.e. with the wave vector of the helix $q_0=2\pi/p_0$, tending to zero, and in FLC the value of rotational viscosity $\gamma_\phi$ must be in the range $0.3<\gamma_0<1.0$ Poise, the spontaneous polarization Ps must not exceed 50 nC/cm$^2$, and the value of elastic modulus K, determining the deformation along smectic layers must be in the range $(1-3)\cdot10^{-12}$ Newton;

2) using as a light source in the video projector, the semiconductor laser diodes with red, green and blue radiation, instead of RGB-LEDs;

3) input into an unit of information laser readout the new element—a despeckler based on a single-pixel cells with FLC, providing spatial phase modulation of the laser radiation on the refractive index gradients in FLC layer;

4) input into a video projector a scanning unit that allows to implement the spatial scan of the output beam with images formed in a micro display.

The technical result of the present invention is the creation of a high-speed video projector with improved compared to the prototype characteristics: with increased almost twice (up to 540-600 Hz) frame rate and comfortable perception (due to mentioned above) of 3D stereoscopic images, even with sequential color change in time in a single micro display with the structure FLCoS; with an extended color gamut and enhanced brightness of images. Speckle-noise accompanying the use of a laser beam for image formation is suppressed by the electrically controlled despeckler input to the device. Moreover, it will be possible real time displaying on a screen the information blocks with capacitance of $10^8 \ldots 10^9$ pixels and with different geometrical configuration.

The Advantages of the Proposed Device are as Follows:

1) the continuous hysteresis-free modulation characteristic, the frequency of light modulation up to a few kHz and lower power consumption compared to the prototype are implemented in FLCOS-structure of a micro display of the video projector at FLC addressing by alternating pulses of the amplitude of ±1.5;

2) compared with the use of LEDs the laser diodes provide almost an order greater the power density that allows increasing the image brightness on a screen and/or a screen size, as well as to reach extended color gamut not achievable for LED;

3) inserted into the video projector, a despekler based on FLC cell, being effective, not mechanical, simple and compact element of destruction of spatial-temporal coherence of a laser beam and its ability to interfere, extends the use of lasers in video projectors;

4) inserted into the video projector, an input of scanning provides the possibilities of expanding the capacity of information blocks on a screen up to $10^8 \ldots 10^9$ pixels, and with the possibility of variations in their geometric configuration.

The main advantage of the claimed high-speed video projector is the possibility of forming speckle-free, high-brightness and color-saturated images, with continuous gray scale, with a frame rate of 600 Hz and more, at a small value of the alternating voltage (±1.5 V), and the creation on a projection (not composed) screen of the high capacity information blocks (up to $10^8 \ldots 10^9$ pixels).

To improve light modulation characteristic in FLCoS-structure of a micro display and in a despeckler one can individually or collectively: to change the liquid crystal composition, to change a mode of electrically controlled light modulation, to modify a design and unit structure etc. In an unit of readout the laser diodes can be used both with a longitudinal, and vertical (transverse) resonator, made on the basis of hetero structures with quantum dots and wells, optimized on wavelength to reach the best color gamut. The device of a linear or two-dimensional spatial scan can be modified according to the principle of action and construction in order to increase the capacity of deployed images and the sweep rate, and to extend the range of image scan zone on a projection screen.

Thus, the proposed high-speed video projector provides the formation of color images with a frame rate of 600 Hz and more, with continuous gray scale, and laser diodes of red, green and blue radiation readout these images. To destroy the ability of laser rays to interfere a despeckler is inserted which is a cell with FLC implementing fast electrically controlled phase light modulation with a depth of $\geq\pi$. To form on a screen the information blocks with a capacity of $10^8 \ldots 10^9$ pixels with different geometric configurations the two-dimensional scanner is input, optically coupled to an optical unit of readout and to a screen on which this information is projected.

INDUSTRIAL APPLICABILITY

Obviously, that FLC high speed can most effectively be implemented in high-speed micro displays on the base of structure FLCoS with silicon control integrated circuits. Such micro displays and video projectors based on them can be used in projection displays, including pico projectors, in high-speed systems of data processing, coding and recognition, in a variety of 2D and 3D television systems.

Using high-speed video projectors it is expected also to create devices with new functional features that are not yet available because of the limited speed of NLC and NLC based video projectors, namely, in the multi-program and multi-user systems of three-dimensional vision, including stereoscopic (with glasses) and autostereoscopic (glasses-free) or volumetric (with 3D screen) systems. Image scanning over a projection screen, including circular screen, opens new possibilities of using the video projectors in a variety of panoramic systems, primarily advertising. Video projectors with the highest spatial resolution are required in digital cinema and other displaying apparatus of collective use (including dual use), since they allow to avoid the use of complicated systems composed of a set of individual monitors.

Thus, the proposed device can be used in a variety of devices and systems for visualization, displaying, storage and processing the information with high information capacity, as well as in optical devices and systems of advertising, show-business, and so on.

EXAMPLE OF EMBODIMENT

To implement the present invention, a few experimental samples of components of a video projector were made, namely, display cells with helix-free FLC for FLCoS-structure and FLC based a despeckler, which was inserted in the channel of data readout with laser diode. The scheme of scanning the readout and deployed images on a projection screen was also simulated, and the characteristics of indicated components and units for readout and scanning were measured.

For FLCoS-structure FLC with compensated helix was used, where a helix with a pitch of 0.45 micrometers was suppressed due to the interaction of chiral additives with opposite signs of the optical activity. Such FLC possessed the following material parameters: coefficient of rotational viscosity $\gamma_\phi$=0.7 Poise, spontaneous polarization $P_S$=40 nC/cm², and the modulus of elasticity $K_\psi$, determining the deformation along smectic layers, was $1 \cdot 10^{-12}$ Newton. The temperature range of the existence of ferroelectric phase in used FLC was in the range from +5° C. to +70° C. As the transparent anisotropic orienting cover in FLC cell a centrifuge manufactured polyimide film with a thickness of about 30 nm was used which was rubbed. As the dielectric coating the aluminum dioxide deposited film with a thickness of 70 nm was used.

Figure 5:
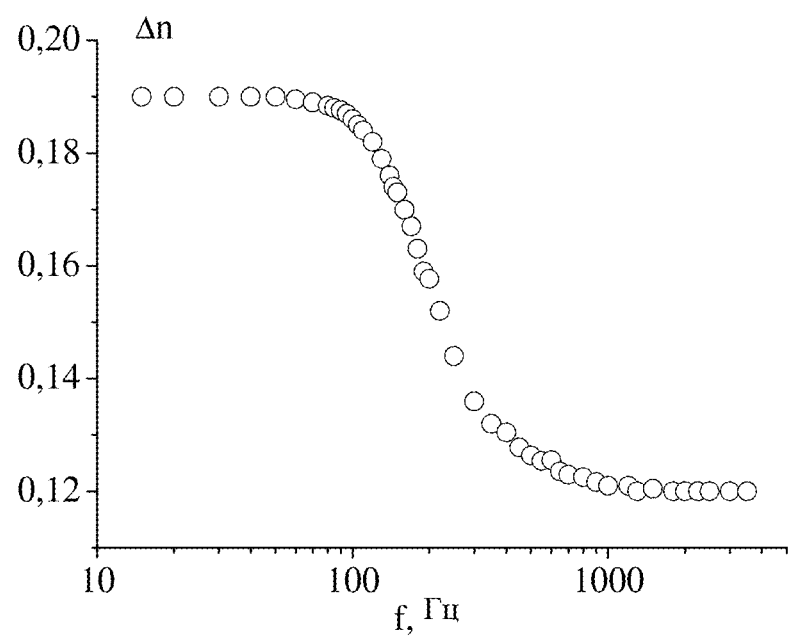
FIG. 5—Graph of frequency dependence of birefringence of the helix-free FLC.

At the specified ratio between the values of the rotational viscosity, the spontaneous polarization and the modulus of elasticity the birefringence index exhibits a specific dependence on the frequency of the electric field (FIG. 5), indicating the occurrence in helix-free FLC the spatial periodic deformations of smectic layers, resulting in the soliton mechanism of reorientation of the FLC director. In the case of the homeotropic orientation of the director of helix-free FLC (smectic layers are parallel to the substrate of an electro optic cell), these deformations were observed through the crossed polarizers in the form of alternating light and dark stripes with a period from 1.5 to 5 microns, which depends on the molecular structure of FLC.

Figure 6:
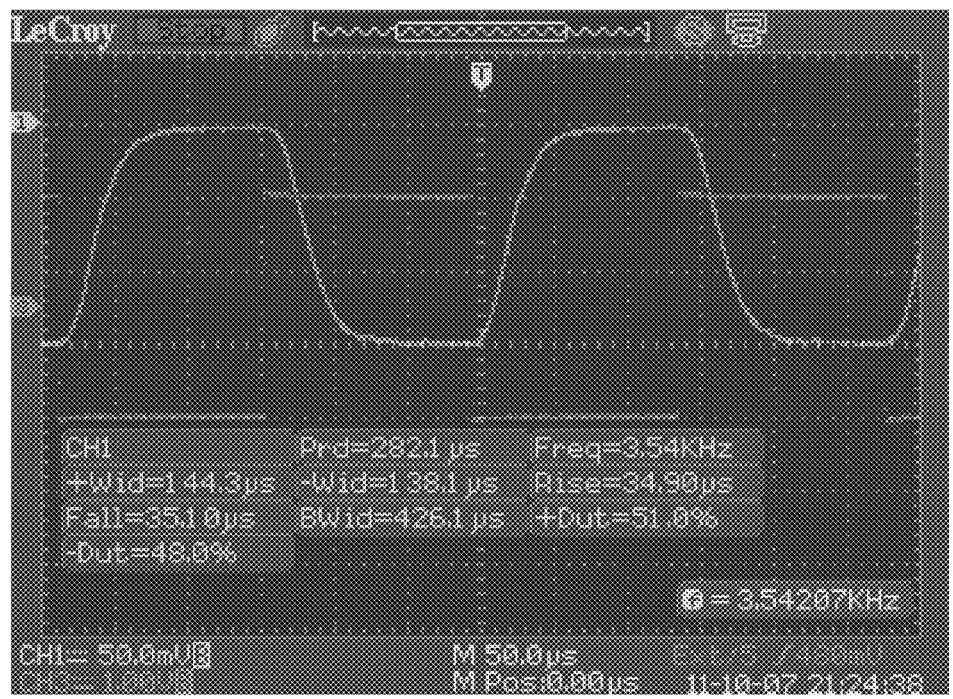
FIG. 6—displayed on an oscilloscope of Le Croy oscillogram of the electro-optical response (pulses smoothed in corners, a zero on line 1) of a cell with the helix-free FLC versus the control voltage—meander with the amplitude ±1.5 V and the frequency of 3542 Hz (rectangular wave pulses, a zero on line 3, the division of large vertical scale 1V). Electro optical cell with dielectric coating on one substrate, the thickness of FLC layer 1.7 micrometers. Upper level of the optical response—closed state, the bottom—transmissive. Time $\tau_{0,1-0,9}$ on the front edge—Rise=34.90 microseconds, on the falling edge—Fall=35.1 microseconds.

Experiments have shown that the transition to the soliton mode occurs at a frequency of the control voltage of about 170 Hz. In this mode the electro-optical response time is determined by a speed of the soliton waves (ratio 1) and relatively weakly dependent on the frequency of the control voltage. The maximal frequency of light modulation at the control voltage (square wave) ±1.5 V was 3.5 kHz (FIG. 6). From the waveform presented here is also seen that the time response of the electro optical cells with helix-free FLC is only about 35 microseconds for both polarities of applied voltage that is 15-20 microseconds less than for the response time of a cell with helix FLC.

These results indicate that the speed of FLC, proposed for use in the structure FLCoS of a micro display of the video projector, significantly (more than an order of magnitude) higher than NLC speed, and high modulation frequencies indicated are achieved at a low control voltage (in structures with NLC the voltage is twice higher). It is extremely important that the high frequency modulation is not required to be modulated additionally for obtaining the halftones, as in the prototype, because grayscale is realized physically by changing the amplitude of a control voltage. This results in the immediate benefit in speed (several times) and also in simplicity of the electronics. In this connection, the integral elements 14 of addressing and control in FLCoS-structure (FIG. 1), manufactured using a standard CMOS process, different from those in the prototype (here are not considered). Furthermore, due to the low control voltage it is possible without overheating FLCOS-structure to form in it the data matrices of 2K 3K and even 4K pixels. A thin (about 1 micrometer) layer of FLC allows to reduce a pixel size and spacing between them, and to reach for example, the spatial resolution of 4096×4096≈$1.6 \cdot 10^7$ pixels at its size of 5 and pixel period of 6 micrometers at the working aperture of about 6 cm² (about 1 sq. Inch).

Estimations based on the above results show that high-frequency properties of FLCoS-structure together with FLC high speed allow easy to carry out simultaneously and sequential change of colors in time, and forming 3D images (i.e., image pairs, respectively, for the left and right eyes), and still to provide the frame rate for each eye of 90-100 Hz—favorable for comfortable perception of images (without flicker, tightening and blur). Since the method of sequential color change requires threefold less number of pixels in the structure (there no sub-pixels), then it means that the same number of pixels can provide three times more spatial resolution in the FLCoS-structure.

To readout the information formed in FLCoS-structure of a micro display instead of RGB LED emitters three semiconductor laser diodes with red, green and blue radiation are suggested to be used. Compared with LEDs, they provide almost an order of magnitude greater power density that allows increasing the image brightness on a screen and/or its size. Due to the high monochromaticity of laser radiation a display with laser readout of information will have expanded color gamut, not achieved by means of LEDs, and much better compared with incandescent or discharge light sources. In experiments on information readout a laser diode with red wavelength of 0.65 micrometers was used.

As already was mentioned, the obstacle to use lasers is their high degree of coherence resulting in the interference of rays, and as a consequence, to spotty (speckle) structure of images called speckle-noise. To reduce or even to suppress speckle-noise in images a compact single-pixel FLC cell was inserted into the channel of laser reading out (unit 2 in FIG. 1) and was used as a despeckler 9. When the radiation of a laser diode at a wavelength of 0.65 micrometers passed through FLC cell its phase was modulated randomly in the volume of FLC layer [9]. FLC cell of a despeckler 9 had the working aperture of about 1 cm2 and a thickness of 16 micrometers. It was set into a mechanical frame with electrical contacts and was controlled by a compact electronic circuit that generated an alternating periodic electrical signal in the form of a meander with an amplitude of ±30 V and a frequency of about 450 Hz, which was modulated with a higher frequency −3.5 kHz by other meanders with an amplitude of ±20 V.

Figure 7:
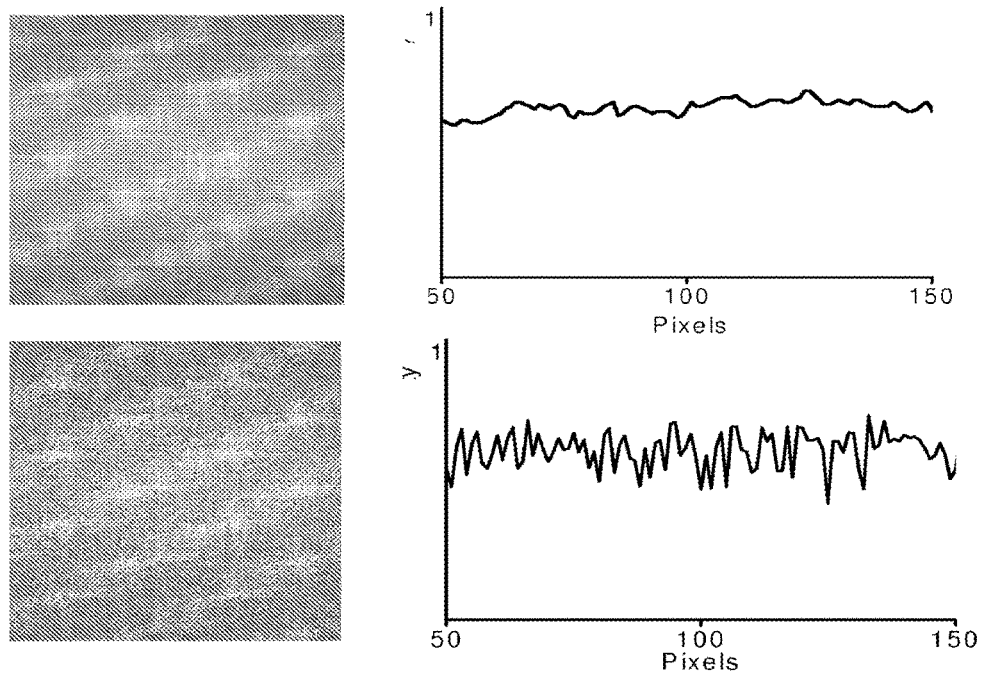
FIG. 7—Photos of patterns in the section of a laser beam (left) and distributions of the light intensity in them (right) at ON (top) and OFF (bottom) control electrical signals.

As a result, in the volume of FLC layer the small-scale (not larger than half-pitch of a helix) gradients of the refractive index are formed. They modulate the phase of light nonuniformly over square and depth of a cell with a depth up to 4π, and by means of this destruct the spatial and temporal coherence of the laser beam and its ability to interfere. Hence, a substantial reduction (actually suppressing) of the speckle noise in projected images was reached. This fact is clearly illustrated in FIG. 7 by photos of images (left) and graphs (right) of radiation intensity distribution in the cross section of a laser beam, respectively, when the control electrical signals are supplied (upper photo and graph) and absent (bottom photo and graphics).

The simulation showed that when electromechanical (galvanometer) rotating mirror scanner is installed in the output of optical channel of the video projector it becomes possible a two-dimensional space scan of the output light beam with an image formed in the micro display and thereby expanding the capacity of information blocks on a screen up to $10^8 \ldots 10^9$ pixels, and with the possibility to vary their geometric configuration.

Taking into account that the new helix-free FLC is able to modulate light with a frequency of several thousand Hz, then for equivalent high-frequency data input and pixels addressing in FLCoS-structure of a micro display the overall spatial resolution of the claimed video projector can reach $10^8 \ldots 10^9$ pixels. Images displayed separately may be not necessarily the fragments of one highly informative frame; separately or by groups, they can be also independent programs. For comparison, if in [9] viewers may watch different television programs on the same monitor, using synchronized with these programs optical shutters of active stereo glasses, then due to the claimed video projector one can not only realize the same case, but also spatially separate these program for their independent observation by different viewers, and without glasses. With respect to the standard (120 Hz) video projectors based on LCoS structure with NLC a stock (reserve) in the speed of the claimed video projector so large that several programs of 3D vision can be demonstrated on a high-resolution screen.

LITERATURE

1. Chris Chinnock. *Wanted: 3D 4K HFR WCG LIP*, Apr. 18, 2012 (http://displaydaily.com/2012/04/18/wanted-3d-4k-hfr-wcg-lip/). Visit Amazon's David Armitage Pagesearch resultsLearn about Author Central
2. David Armitage, Ian Underwood, Shin-Tson Wu. Introduction to Microdisplays. Wiley Series in Display Technology, 377 p. (2006).
3. Alexander Samarin. LCoS—microdisplays and their application. Components and technologies, No 8, 24-32 (2008).
4. Denis Darmon, John R. McNeil, and Mark A. Handschy. LED-Illuminated Pico Projector Architectures. SID-08 Symposium Digest, v. 39, Issue 1, 1070-1073 (2008).
5. M. A. Handschy, N. A. Clark and S. T. Lagerwall. Phys. Rev. Lett., v. 51, p. 471 (1983).
6. N. A. Clark, S. T. Lagerwall. Sub-microsecond switching in ferroelectric liquid crystals. J. Appl. Phys., v. 36, pp. 899-903 (1980).
7. Fedosenkova T. B., Andreev A. L., Pozhidaev E. P., Kompanets I. N. Electrically controlled the birefringence in helix-free ferroelectric liquid crystals. Bulletin of the Lebedev Physical Institute, No 3, 45-52 (2002).
8. Andreev A. L., Kompanets I. N., Minchenko M. V., Pozhidaev E. P., Andreeva T. B. Speckle noise suppression using the liquid crystal cell. Quantum Electronics, Vol. 38, No 12, 1166-1170 (2008).
9. Heinrich Shih Ko, Jae Won Paik, Gary Zalewski. Patent Application Publication. Pub. No.: US 2010/0177172 A1. Pub. Date: Jul. 15, 2010.

The invention claimed is:
1. A video projector comprising:
a liquid crystal micro display including a Ferroelectric Liquid Crystal on Silicon ("FLCoS") device,
and an optical unit for reading and displaying information formed in the FLCoS device, the optical unit including a light source and projection optics and being optically coupled to the FLCoS device for projecting the information onto a screen, wherein:
the electro optical material in the FLCoS device is a ferroelectric liquid crystal,
the ferroelectric liquid crystal having
a helix wave vector $q_0 = 2\pi/p_0$ tending to zero, where $p_0$ is the helix pitch,
a rotational viscosity of $0.3 < \gamma_\phi < 1.0$ Poise,
a spontaneous polarization Ps not exceeding 50 nC/cm$^2$, and
a modulus of elasticity K of $(1-3) \times 10^{-12}$ Newton; and
the light source comprises red, green and blue lasers, each laser in a different RGB color channel.

2. A video projector according to claim 1, the video projector further including a despeckler including an electrically controlled ferroelectric liquid crystal-filled cell, the despeckler providing spatial phase modulation of incident radiation from the laser light source with a depth of $\pi$ to destroy the spacial and temporal coherence of the incident radiation.

3. A video projector according to claim 2, the projection optics including a two-dimensional scanning device for displaying the information on the screen.

4. A video projector according to claim 1, the projection optics including a two-dimensional scanning device for displaying the information on the screen.

5. A video projector comprising
a liquid crystal micro display including a Ferroelectric Liquid Crystal on Silicon ("FLCoS") device,
and an optical unit for reading information formed in the FLCoS device, the optical unit including a light source and projection optics and being optically coupled to the FLCoS device for projecting the information onto a screen, wherein:
the electro optical material in the FLCoS device is a ferroelectric crystal,
the ferroelectric liquid crystal having
a helix wave vector $q_0 = 2\pi/p_0$ tending to zero, where $p_0$ is the helix pitch,
a rotational viscosity of $0.3 < \gamma_\phi < 1.0$ Poise,
a spontaneous polarization Ps not exceeding 50 nC/cm$^2$, and
a modulus of elasticity K of $(1-3) \times 10^{-12}$ Newton;
the light source comprises red, green and blue lasers, each laser in a different RGB color channel, and
the video projector further including:
a despeckler including an electrically controlled ferroelectric liquid crystal-filled cell, the despeckler providing spacial phase modulation of incident radiation from the laser light source with a depth of $\pi$ to destroy the spatial and temporal coherence of the incident radiation; and
the projection optics including a two-dimensional scanning device for displaying the information on the screen.

* * * * *